(12) United States Patent
El Khamlichi Drissi et al.

(10) Patent No.: US 10,075,122 B2
(45) Date of Patent: Sep. 11, 2018

(54) METHOD OF CONTROLLING A THREE-PHASE INVERTER IMPLEMENTING A VECTOR MODULATION

(71) Applicants: UNIVERSITÉ CLERMONT AUVERGNE, Clermont Ferrand (FR); CENTRE NATIONAL DE LA RECHERCHE SCIENTIFIQUE, Paris (FR); ECOLE D'INGENIEURS SIGMA CLERMONT, Aubière (FR)

(72) Inventors: Khalil El Khamlichi Drissi, Cournon d'Auvergne (FR); Abbas Dehghanikiadehi, Aubière (FR); Christophe Pasquier, Dallet (FR)

(73) Assignee: CENTRE NATIONAL DE LA RECHERCHE SCIENTIFIQUE (FR)

( * ) Notice: Subject to any disclaimer, the term of this patent is extended or adjusted under 35 U.S.C. 154(b) by 0 days.

(21) Appl. No.: 15/517,808

(22) PCT Filed: Oct. 8, 2015

(86) PCT No.: PCT/FR2015/052708
§ 371 (c)(1),
(2) Date: Apr. 7, 2017

(87) PCT Pub. No.: WO2016/055742
PCT Pub. Date: Apr. 14, 2016

(65) Prior Publication Data
US 2017/0317636 A1    Nov. 2, 2017

(30) Foreign Application Priority Data
Oct. 9, 2014   (FR) ..................... 14 59674

(51) Int. Cl.
*H02P 27/12*  (2006.01)
*H02M 1/08*  (2006.01)
*H02M 7/44*  (2006.01)

(52) U.S. Cl.
CPC ............ *H02P 27/12* (2013.01); *H02M 1/082* (2013.01); *H02M 7/44* (2013.01)

(58) Field of Classification Search
CPC ......... H02M 2001/0012; H02M 1/082; H02M 1/085; H02M 7/53871; H02M 7/53873; H02M 7/53876; H02M 7/797
(Continued)

(56) References Cited

U.S. PATENT DOCUMENTS

2008/0266918 A1   10/2008  Vilain et al.
2011/0299308 A1*  12/2011  Cheng ................... H02M 1/44
                                                          363/37
(Continued)

FOREIGN PATENT DOCUMENTS

CN   103138617   6/2013
FR     2895598   6/2007
WO  2004036755   4/2004

OTHER PUBLICATIONS

International Search Report, International Application No. PCT/FR2015/052708, dated Dec. 16, 2015.
(Continued)

*Primary Examiner* — Jeffrey Sterrett
(74) *Attorney, Agent, or Firm* — Perman & Green, LLP (57) ABSTRACT

The disclosed embodiment relates to a method of controlling a system including at least one inverter with six switches, which is linked to a battery, and supervised by a processor. The method implements a vector modulation, so that it is able to prevent the current linking the battery from passing through zero amperes by means of appropriate control logic.

(Continued)

The disclosed embodiment also relates to a device for controlling an electronic component.

4 Claims, 5 Drawing Sheets

(58) Field of Classification Search
USPC .............................................. 363/40, 41, 98
See application file for complete search history.

(56) References Cited

U.S. PATENT DOCUMENTS

| | | | |
|---|---|---|---|
| 2012/0201056 A1* | 8/2012 | Wei | H02M 5/4585 363/37 |
| 2014/0070736 A1 | 3/2014 | Gorka | |
| 2014/0233262 A1 | 8/2014 | Zhao et al. | |

OTHER PUBLICATIONS

Lai, et al "Optimal Common-Mode Voltage Reduction PWM Technique for Inverter Control With Consideration of the Dead-Time Effects-Part I: Basic Development", IEEE Transactions on Industry Applications, vol. 40, No. 6, Nov./Dec. 2004, pp. 1605-1612.

* cited by examiner

METHOD OF CONTROLLING A THREE-PHASE INVERTER IMPLEMENTING A VECTOR MODULATION

CROSS-REFERENCE TO RELATED APPLICATIONS

This application is the National Stage of International Application No. PCT/FR2015/052708, having an International Filing Date of 8 Oct. 2015, which designated the United States of America, and which International application was published under PCT Article 21(2) as WO Publication No. 2016/055742 A1, and which claims priority from and the benefit of French Application No. 1459674, filed on 9 Oct. 2014, the disclosures of which are incorporated herein by reference in their entireties.

BACKGROUND

1. Field

The presently disclosed embodiment pertains to the field of power electronics.

The presently disclosed embodiment pertains more particularly to a method of controlling a three-phase inverter implementing a vector modulation technique.

2. Brief Description of Related Developments

The scientific publication *"Optimal Common-Mode Voltage Reduction PWM Technique for Inverter Control With Consideration of the Dead-Time Effects—Part I: Basic Development"* (Yen-Shin Lai and Fu-San Shyu—*IEEE Transactions on Industry Applications. Vol. 40 No. 6 November/December* 2004) is known in the prior art. This scientific publication relates to the PWM ("Pulse Width Modulation") technique, and more particularly to reducing the common-mode voltage.

U.S. Patent Publication No. US 2014/0070736 ("Bayerische Motoren Werke Aktiengesellschaft"—BMW AG), which describes a power electronics apparatus and a method of piloting for an electrical machine and for the storage of electrical energy is also known in the prior art. This U.S. patent Publication describes a power electronics structure comprising an inverter to which an electrical machine can be connected, and at least one half-bridge to which two electrical energy storage devices can be connected. One of the two electrical energy storage devices supplies at least in a temporary manner the electrical machine and the other of the two electrical energy storage devices charges at least in a temporary manner another electrical energy storage device from among at least the two electrical energy storage devices by means of the electrical machine and of one of the half-bridges. Accordingly, a method of control for switching the power electronics operates according to the principle of spatial vector modulation.

Figure 1:
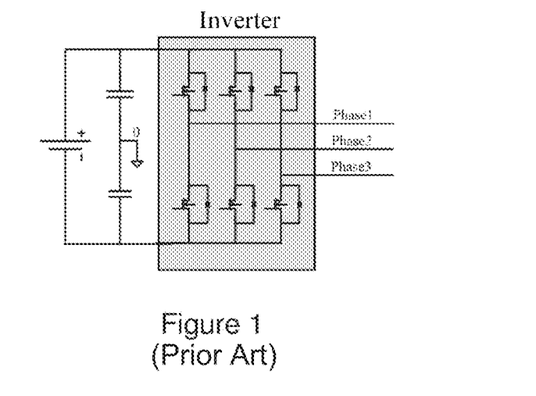
FIG. 1 illustrates a three-phase inverter structure with fictitious or non-fictitious capacitive midpoint O.

SVM ("Space Vector Modulation") type modulation is known in the prior art. It is a method implemented in a digital manner to control three-phase inverters. This method is implemented in electric vehicles in particular. Modulation of SVM type uses vectors which correspond to individual switching configurations to generate a reference voltage. FIG. 1 illustrates a three-phase inverter structure. In a binary manner, each vector results from a specific combination. For a three-phase inverter, such as represented in FIG. 1, there are eight ($2^3$) possible combinations. Table 1 hereinbelow indicates each vector and the corresponding voltage for each phase on the basis of a switching function which indicates "0" for open ("OFF") and "1" for closed ("ON").

TABLE 1

Vector corresponding to the switching logic

| Gate "a" | $V_{ao}$ | Gate "b" | $V_{bo}$ | Gate "c" | $V_{co}$ | Index number of vector |
|---|---|---|---|---|---|---|
| 0 | $-V_{dc}/2$ | 0 | $-V_{dc}/2$ | 0 | $-V_{dc}/2$ | 0 |
| 0 | $-V_{dc}/2$ | 0 | $-V_{dc}/2$ | 1 | $V_{dc}/2$ | 5 |
| 0 | $-V_{dc}/2$ | 1 | $V_{dc}/2$ | 0 | $-V_{dc}/2$ | 3 |
| 0 | $-V_{dc}/2$ | 1 | $V_{dc}/2$ | 1 | $V_{dc}/2$ | 4 |
| 1 | $V_{dc}/2$ | 0 | $-V_{dc}/2$ | 0 | $-V_{dc}/2$ | 1 |
| 1 | $V_{dc}/2$ | 0 | $-V_{dc}/2$ | 1 | $V_{dc}/2$ | 6 |
| 1 | $V_{dc}/2$ | 1 | $V_{dc}/2$ | 0 | $-V_{dc}/2$ | 2 |
| 1 | $V_{dc}/2$ | 1 | $V_{dc}/2$ | 1 | $V_{dc}/2$ | 7 |

The SVM method, based as it is on mathematical transformations, is appropriate for programming on processors of "Digital Micro Processors" type.

In traditional SVM methods, the common-mode voltage (CMV) can take the following values: $+/-V_{dc}/2$ or $+/-V_{dc}/6$ as a function of the vectors used. During the switching times, the common-mode voltage can vary by $+/-V_{dc}/3$. The common-mode current or CMC from which the leakage current originates is proportional to the variations of the CMV levels.

Methods for reducing the common-mode voltage have recently been proposed.

SUMMARY

The presently disclosed embodiment intends to remedy the drawbacks of the prior art by proposing a method of control offering better performance than the methods of the prior art, in particular within the framework of use in electric vehicles.

For this purpose, the presently disclosed embodiment relates, in its most general acceptation, to a method of controlling a system comprising at least one six-switch inverter, linked to a battery, and piloted by a processor, said method implementing a vector modulation, characterized in that it is able to prevent the current absorbed by the battery from passing through zero Amperes by means of appropriate control logic.

The method according to the presently disclosed embodiment makes it possible to obtain the following results:
 Increase the efficiency;
 Reduce the common-mode voltage and current;
 Reduce the impact in respect of electromagnetic compatibility;
 Limit the undulations in current taken at the batteries; and
 Reduce the dimensions of the filter of the DC bus.

The method according to the presently disclosed embodiment makes it possible to limit the abrupt and periodic loadings of the DC bus (battery in particular) and to reduce switching losses.

By virtue of the presently disclosed embodiment, the lifetime of the batteries, of the power components and of the motorization is increased. The presently disclosed embodiment makes it possible to increase the lifetime of the system, with enhanced adaptability.

Advantageously, the method according to the presently disclosed embodiment does not require the addition of further components. This makes it possible not to increase production costs.

According to one aspect, said method comprises a step of modifying a circular vector into another form which, as a function of the radius of a reference vector, can be transferred to the surface of a hexagon.

According to one aspect, said method comprises a step of calculating the resulting zero time, and a step of allocating this time to the neighboring vectors, by allocating k to the first vector in each sector and (1−k) to the second vector, k lying between 0 and 1.

The presently disclosed embodiment also pertains to a device for controlling a system comprising at least one inverter composed of six switches, linked to a battery, and controlled by a processor, said device comprising means for implementing a vector modulation, characterized in that it comprises means for preventing the current absorbed by the battery from passing through zero Amperes by means of appropriate control logic.

BRIEF DESCRIPTION OF THE DRAWINGS

The disclosed embodiment will be better understood with the aid of the description, given hereinafter purely by way of explanation, of an aspect of the disclosed embodiment, with reference to the Figures in which.

DETAILED DESCRIPTION

The previous SVM methods are characterized by the following relation. To construct the reference vector, the third term ($t_z V_0$) must be zero.

$$T_s V_{ref} = t_i V_i + t_{i+1} V_{i+1} + t_z V_0$$

$$T_s = t_i + t_{i+1} + t_z$$

In the method according to the presently disclosed embodiment, the zero time is avoided by allocating in an equal manner a calculated zero time to two near active-vectors as follows.

$$t_{i(new)} = (t_i + t_z/2)$$

$$t_{i+1(new)} = (t_{i+1} + t_z/2)$$

$$T_s V_{ref(new)} = (t_i + t_z/2)V_i + (t_{i+1} + t_z/2)V_{i+1}$$

$$V_{ref(new)} = (\alpha_i + \alpha_z/2)V_i + (\alpha_{i+1} + \alpha_z/2)V_{i+1} \text{ with}$$

$$\alpha_i = \frac{t_i}{T_S} = \frac{|V_{ref}|}{|V_i|} \frac{\sin(\frac{\pi}{3} - \theta)}{\sin(\frac{\pi}{3})},$$

$$\alpha_{i+1} = \frac{t_{i+1}}{T_S} = \frac{|V_{ref}|}{|V_{i+1}|} \frac{\sin(\theta)}{\sin(\frac{\pi}{3})} \text{ and } \alpha_z = 1 - \alpha_i - \alpha_{i+1}$$

$T_s$ is the sampling period.

The last equation can be reformulated as the following two equations. Thus, a new reference vector is created. This new reference is calculated as the sum of two near vectors by subtracting $V_{i+1}$ from $V_i$ which is multiplied by $(\alpha_i - \alpha_{i+1})$.

$$V_{ref(new)} = \frac{1}{2}(1 + \alpha_i - \alpha_{i+1})V_i + \frac{1}{2}(1 - \alpha_i + \alpha_{i+1})V_{i+1}$$

$$V_{ref(new)} = \frac{V_i + V_{i+1}}{2} + (\alpha_i - \alpha_{i+1})\frac{V_i - V_{i+1}}{2}$$

Figure 2A:
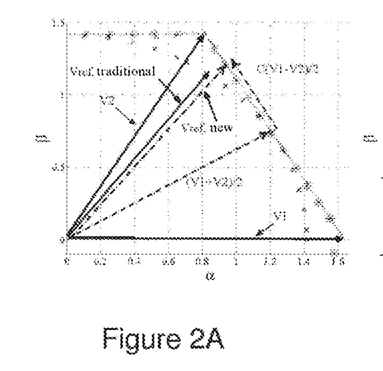
FIGS. 2A and 2B represent a simulation result for a reference vector, within the framework of the presently disclosed embodiment (FIG. 2A with a radius of 0.5 P.u and FIG. 2B with a radius of 0.8 P.u.)

$C = \alpha_i - \alpha_{i+1}$ designates the coefficient indicated in FIG. 2A.

Figure 2B:
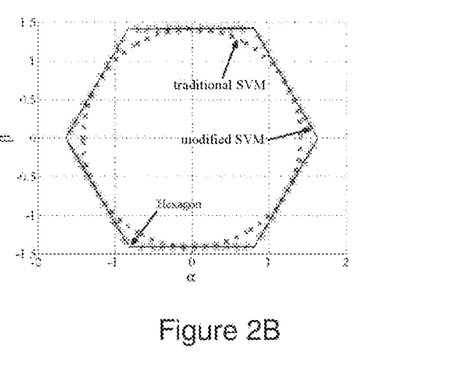

Thus, the method according to the presently disclosed embodiment has changed the circular vector into another form which, as a function of the radius of the reference vector, can be transferred to the surface of the hexagon, as illustrated in FIGS. 2A and 2B. $V_{ref}$ new is obtained by projecting $V_{ref}$ onto the hexagon in a manner parallel to the first bisector of the sector considered.

On the basis of the method according to the presently disclosed embodiment, only two near vectors have been used. Consequently, the zero vectors have been eliminated. Table 2 shows the resulting changes of switching in each sector. As illustrated for each individual sector, two switches have been kept fixed at 1 or 0.

TABLE 2

Switching strategy within the framework of the presently disclosed embodiment

| Breaker | Sector 1 | Sector 2 | Sector 3 | Sector 4 | Sector 5 | Sector 6 |
|---------|----------|----------|----------|----------|----------|----------|
| s1 | 1 | x | 0 | 0 | x | 1 |
| s3 | x | 1 | 1 | x | 0 | 0 |
| s5 | 0 | 0 | X | 1 | 1 | x |

Within the framework of the traditional SVM methods, the vectors can be implemented through varied modulation schemes.

As mentioned in Table 2 hereinabove, within the framework of the presently disclosed embodiment, only two changes of switching are performed.

Thus, within the framework of the method according to the presently disclosed embodiment, the switching losses can be reduced by 66% in comparison with the traditional SVM methods.

Figure 3:
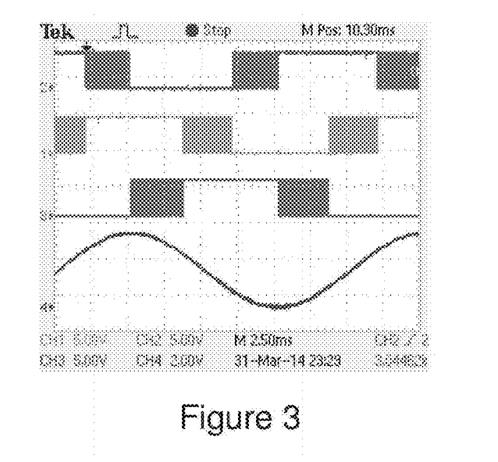
FIG. 3 illustrates the switching logic within the framework of the method according to the presently disclosed embodiment.

FIG. 3 illustrates the switching strategy within the framework of the method according to the presently disclosed embodiment.

FIG. 3 shows the behavior of the switches in the method according to the presently disclosed embodiment, implemented by a right-aligned sequence.

In the method according to the presently disclosed embodiment, a new reference which operates according to a hexagon is imposed instead of implementing a circular reference.

Figure 4:
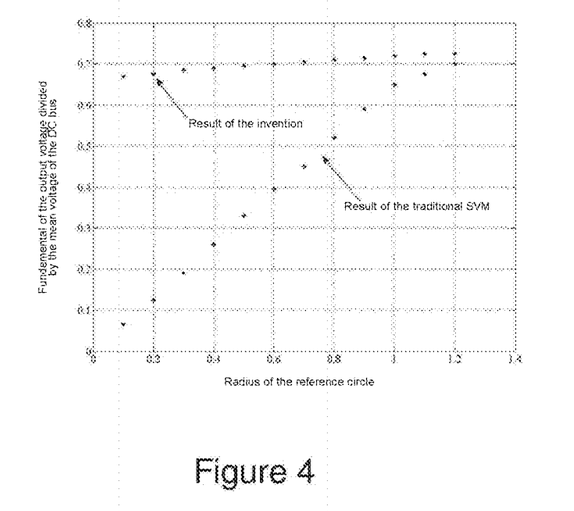
FIG. 4 represents the amplitude of the fundamental of the output voltage divided by the mean voltage of the DC bus as a function of the radius of the reference circle.

FIG. 4 represents the amplitude in voltage per DC voltage as a function of radius.

FIG. 4 shows that in the method according to the presently disclosed embodiment, performance is not linear as in the traditional SVM methods and can vary between 0.73 P.u and 0.65 P.u.

The main results obtained by virtue of the method according to the presently disclosed embodiment are as follows: decrease the current undulation, attenuate the common-mode voltage (CMV), reduce the electromagnetic interactions, avoid the current at zero Amperes, prolong the lifetime of the battery and finally decrease the cost and size of the battery.

Figure 5:
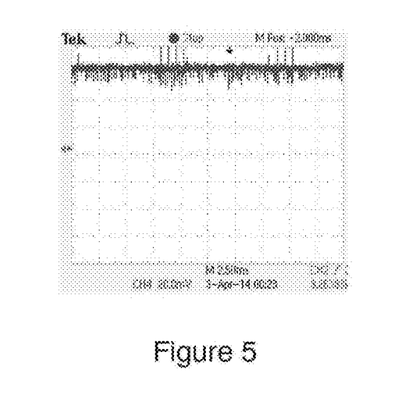
FIG. 5 illustrates the DC mode current within the framework of the method according to the presently disclosed embodiment, by injecting an active power of 1 pu.

FIG. 5 illustrates the DC mode current within the framework of the method according to the presently disclosed embodiment, by injecting an active power of 1 pu.

As may be seen in FIG. 5, the DC mode current is approximately constant by injecting an active power. Without passing through zero, it can satisfy the above-mentioned objectives.

Figure 6A:
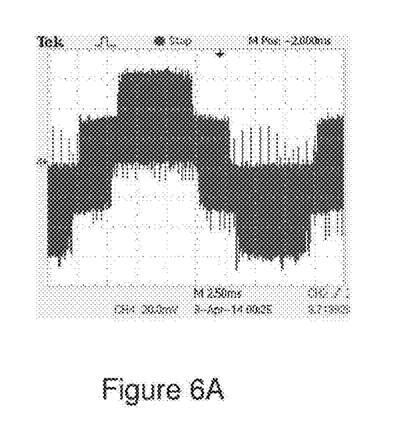
FIGS. 6A and 6B represent the AC mode current for a traditional SVM method of control (FIG. 6A) and for a method according to the presently disclosed embodiment (FIG. 6B) by injecting an active power only.
Figure 6B:
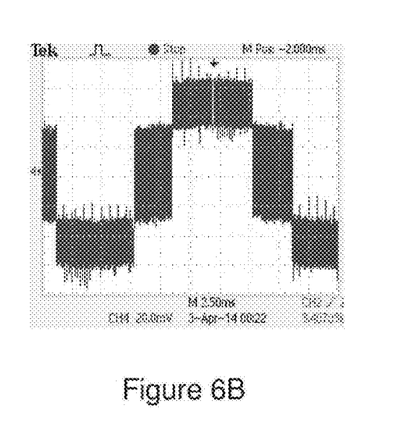

FIGS. 6A and 6B represent the AC mode current for a traditional SVM method (FIG. 6A) and for a method according to the presently disclosed embodiment (FIG. 6B) by injecting solely an active power. Consequently, the phase voltage in AC mode would have the same form as that represented in FIGS. 6A and 6B.

Hereinafter, we will describe a particular aspect of the disclosed embodiment.

After having calculated the resulting zero time from the traditional SVM methods, this time can be allocated in an equal or non-equal manner to the near vectors. By allocating k to the first vector in each sector and (1−k) to the second vector, the performance of the method can be modified. By applying the previous concepts to one of the previous equations, it is possible to extract the following equation, in which k is a value chosen arbitrarily between 0 and 1.

$$T_s V_{ref(new)} = (t_i + (1-k) * t_z) V_i + (t_{i+1} + k * t_z) V_{i+1}$$

$$\alpha_{i(new)} = (\alpha_i + (1-k) * \alpha_z)$$

$$\alpha_{i+1(new)} = (\alpha_{i+1} + k * \alpha_z)$$

Through a non-equal allocation (k≠0.5), the operating zone has a tendency toward the first vector or toward the second vector. Hereinafter, by allocating more time to the first vector (FIG. 7A), the operating zone moves toward the right side of the hexagon. Conversely, by imposing more time toward the left vector (FIG. 7B), it tends to operate on the left side.

Figure 7A:
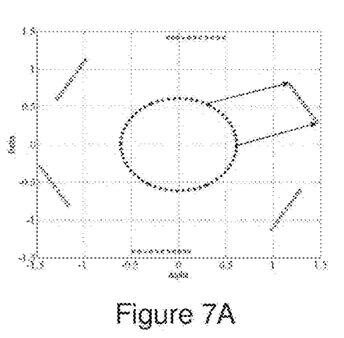
FIGS. 7A and 7B illustrate the operating zone with k=0.33(FIG. 7A) and k=0.66 (FIG. 7B)
Figure 7B:
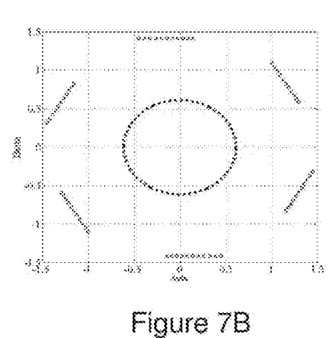

FIGS. 7A and 7B illustrate the operating zone with k=0.33 (FIG. 7A) and k=0.66 (FIG. 7B).

The main factors to be analyzed in order to evaluate the performance are:

the common-mode voltage, this creating common-mode current and leading to the failure of the motor in it windings insulation (consequently, the life of the motor may be shortened);

the electromagnetic interference noise, which depends greatly on the evolution of the common-mode voltage level;

the DC mode zero current, which may shorten the life expectancy of the battery.

The number of switchings depends on the number of "ON" (closed) and "OFF" (open) durations in a constant switching time, as shown in the following Table 3. The number of switchings has a direct relation to switching losses.

TABLE 3

| | Number of switchings | | |
|---|---|---|---|
| Method | Traditional SVM | Method according to the disclosed embodiment | Reduction in loss |
| Number of switchings | 6 | 2 | 66% |
| Novelty | No | Yes | Yes |

Thus, we see that the number of switchings has been divided by three.

In the traditional SVM methods, the common-mode voltage may attain the values of $$\pm \frac{V_{dc}}{2}$$

because of the zero vectors and $$\pm \frac{V_{dc}}{6}$$

because of the active vectors. The electromagnetic interference relates to changes of level of the common-mode voltage which attains $$\frac{V_{dc}}{3}$$

in the best of situations and $$\frac{2V_{dc}}{3}$$

in the worst or situations. Within the framework of the method according to the presently disclosed embodiment, given that Ts is allocated solely to the active vectors, the common-mode voltage may be limited to $$\pm \frac{V_{dc}}{6}$$

and the electromagnetic interference is the result of a change of just $$\frac{V_{dc}}{3}$$

of the common-mode voltage. The following Table 4 provides a summary of the common-mode voltage for each method.

TABLE 4

| | Common-mode voltage | | |
|---|---|---|---|
| Method | Traditional SVM | Method the according to disclosed embodiment | Reduction in the common-mode voltage |
| Maximum common-mode voltage | $\pm \dfrac{V_{dc}}{2}$ | $\pm \dfrac{V_{dc}}{6}$ | 66% |

The inventors of the presently disclosed embodiment have carried out tests and have noted that the method according to the presently disclosed embodiment allows a clear reduction in electromagnetic interference.

The following Table 5 illustrates the electromagnetic interference reduction, which is obtained by virtue of the method according to the presently disclosed embodiment.

TABLE 5

| | Common-mode voltage and electromagnetic interference | |
|---|---|---|
| Method | Measured maximum common-mode voltage | Maximum electromagnetic interference due to the common-mode voltage |
| Method according to the presently disclosed embodiment | 66.6 V | $\dfrac{2*66.6}{T_s}$ |
| Traditional SVM | 190 V | $\dfrac{2*190}{T_s}$ |
| Improvement | Reduction of 65% | Reduction |

The method according to the presently disclosed embodiment also makes it possible to reduce the temperature of the inverter.

Figure 8:
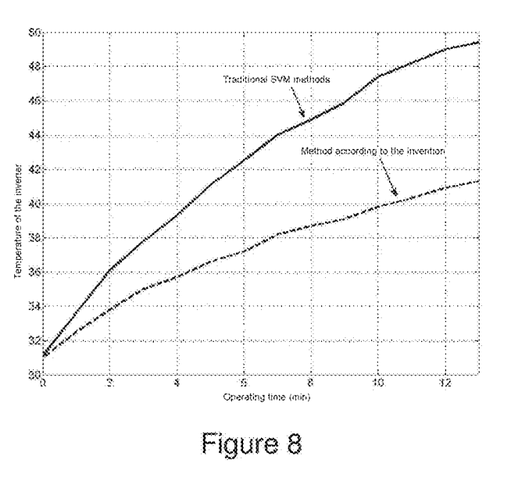
FIG. 8 illustrates results obtained relating to the temperature of the inverter.
Figure 9:
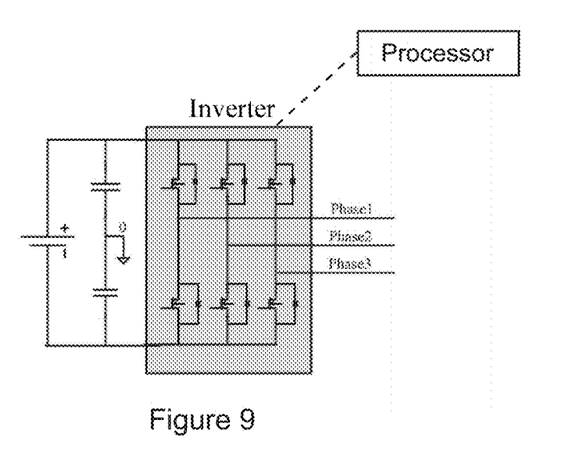
FIG. 9 illustrates a three-phase inverter structure with fictitious or non-fictitious capacitive midpoint O including a processor according to the presently disclosed embodiment.

FIG. 8 and Table 6 hereinbelow illustrate results obtained relating to the temperature of the inverter.

TABLE 6

| | Temperature of the inverter | |
|---|---|---|
| Operating time (minutes) | Temperature with traditional SVMs (centigrade) | Temperature with method according to the invention (centigrade) |
| 0 | 31 | 31.1 |
| 1 | 33.6 | 32.5 |
| 2 | 36.7 | 33.8 |
| 3 | 37.8 | 35 |
| 4 | 39.3 | 35.7 |
| 5 | 41.1 | 36.6 |
| 6 | 42.5 | 37.2 |
| 7 | 44 | 38.2 |
| 8 | 44.9 | 38.7 |
| 9 | 45.9 | 39.1 |
| 10 | 47.4 | 39.8 |
| 11 | 48.2 | 40.3 |
| 12 | 49 | 44.9 |
| 13 | 49.4 | 41.3 |

The performance of the inverter is in particular defined the efficiency as the ratio between the AC mode output power of the inverter (in effective value) and the DC mode input power which is imposed as input source.

The performance obtained by virtue of the presently disclosed embodiment is represented in Table 7 hereinbelow:

| Method | DC mode voltage | DC mode current | Input power | Output power | Efficiency |
|---|---|---|---|---|---|
| Traditional SVMs | 401 Volts | 6.78 Amperes | 2718 Watts | 2500 Watts | 91.4% |
| Method according to the disclosed embodiment | 402 Volts | 7.29 Amperes | 2930 Watts | 2820 Watts | 96.7% |

Thus, the efficiency of the system has been improved by more than 5%.

The disclosed embodiment is described in the foregoing by way of example. It is understood that the person skilled in the art is able to carry out different variants of the disclosed embodiment without, however, departing from the scope of the disclosed embodiment.

What is claimed is:

1. A method of controlling a system comprising at least one six-switch inverter, linked to a battery, and controlled by a processor, said method comprising the following steps:
   allocation of a zero time to two predetermined near active-vectors; and
   determination of a new reference vector on the basis of the two near active-vectors,
   wherein current flowing from the battery is prevented from passing through zero Amperes.

2. The method as claimed in claim 1, further comprising a step of modifying a circular vector into another form which, as a function of the radius of a reference vector, can be transferred to the surface of a hexagon.

3. The method as claimed in claim 1, further comprising a step of calculating the resulting zero time, and a step of allocating this time to the near vectors, by allocating k to the first vector in each sector and (1−k) to the second vector, k lying between 0 and 1.

4. A device for controlling a system comprising at least one six-switch inverter, linked to a battery, and controlled by a processor, the device comprising:
   means for allocating a zero time to two predetermined near active-vectors; and
   means for determining a new reference vector on the basis of the two near active-vectors,
   wherein current flowing from the battery is prevented from passing through zero Amperes by means of appropriate control logic.

* * * * *